Patented Aug. 7, 1928.

1,679,998

UNITED STATES PATENT OFFICE.

THÉODORE VOLTZ, OF BASEL, SWITZERLAND, ASSIGNOR TO THE FIRM DURAND & HUGUENIN S. A., OF BASEL, SWITZERLAND.

CHLORINATED HYDROAROMATIC PRODUCTS CONTAINING NITROGEN AND PROCESS OF MAKING SAME.

No Drawing. Application filed February 24, 1923, Serial No. 621,095, and in Germany February 23, 1922.

I have found that by chlorinating the aromatic amines or their hydrochlorides in an indifferent suspension agent which does not allow hydrolysis, and under preclusion of moisture, I obtain highly chlorinated products from hydronuclei which—as a matter of great importance—still contain nitrogen. The term "highly chlorinated" means that the respective hydroaromatic body contains more chlorine atoms than the corresponding aromatic body could contain at all, even when all the positions capable of being substituted, are occupied by chlorine. Neither this particular method of production, nor the bodies obtained themselves are known at present.

There exists only one compound which belongs to this class of bodies that is the 1-chloro-2-acetnaphthylamine tetrachloride described by Claus and Jaeck, Journal für Praktische Chemie 57, 1; but, in contradistinction to the new process, the protection of the amino-group is ensured in this case by acetylating, and the said body constitutes an amino-derivative, whilst the new products comprise an imino-group.

It is also known that it is possible on halogenating to protect the amino-group, by forming the salt. On brominating, there are directly obtained under these conditions brominated amines, that is to say a simple substitution is effected (Michaelis, Berliner Berichte 26, 2196). Chlorine first acts also merely as substituting agent; thus, from aniline and its substitution products there are obtained in the first phase chlorinated anilines. When all positions capable of being substituted are occupied, the chlorine is carried onto the double bonds. The latter reaction has often been observed, but hitherto it has been executed under conditions under which the intermediately produced chloro-derivatives containing nitrogen were unstable and immediately transformed into the corresponding ketones. Zincke, who performed the reactions in the benezene series (Berliner Berichte 27, 537), as well as recently Fries (Berliner Berichte 53, 23, and 54, 193), who caused chlorine to act rigorously on alpha- and beta-aminoanthraquinone, dissolved in glacial acetic acid, a solvent, which in presence of the hydrochloric acid formed during the reaction would immediately hydrolyze the herein described imino-derivatives.

Aniline takes up 7 or 9 atoms of chlorine according to the working conditions. If the operation is conducted in chlorobenzene and heat is applied towards the end of the reaction while continuing for some time the introduction of chlorine I obtain the highest chlorinated product, the octachloro-chloroketimino-hexahydrobenezene

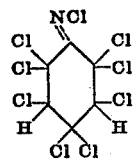

which constitutes a fairly crystalline body fusing at 151° C.

Analysis: calculated 78.39 per cent, found 78.40 per cent of chlorine.

When benezene is employed instead of chlorobenzene and when the introduction of chlorine is interrupted soon after solution takes place, the reaction gives essentially a hexachloro-chloroketimino tetrahydrobenzene of the formula

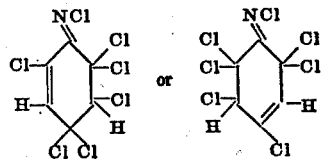

which constitutes also a fairly crystalline body fusing at 125° centigrade.

Analysis: calculated 73.85 per cent, found 73.73 per cent of chlorine.

Both bodies are stable. Only on heating to about 170° C. decomposition takes place with liberation of chlorine.

The two naphthylamines are converted, by taking up 6 atoms of chlorine, into chlorinated tetrahydronaphthylamines. The alpha-naphthylamine thus yields the penta-chloroalpha-chloroketimino tetrahydronaphthalene of the formula

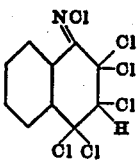

in the form of prismatic crystals fusing at 122° centigrade.

Analysis: calculated 60.48 per cent, found 60.53 per cent of chlorine.

The beta-naphthylamine gives the pentachloro-beta-chloro-ketimino tetrahydronaphthalene of the formula

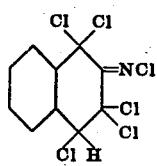

in the form of prisms fusing at 118.5° centigrade.

Analysis: calculated 60.48 per cent, found 60.6 per cent of chlorine.

While on working upon beta-naphthylamine the reaction is already achieved at the temperature of the working room, it will be necessary on the treatment of alpha-naphthylamine to raise the temperature at the end to about 100° C., whereby working in chlorobenzene is required.

The aminoanthraquinones act exactly as the naphthylamines; there are also introduced 6 atoms of chlorine. Alpha-aminoanthraquinone furnishes a pentachloro-alpha-chloroketimino tetrahydroanthraquinone of the formula

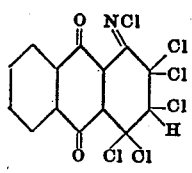

in the form of bright-yellow prisms, melting with decomposition at 190° centigrade.

Analysis: calculated 49.23 per cent, found 49.0 per cent of chlorine.

Beta-aminoanthraquinone gives the corresponding beta-derivative in the form of rhombic leaves fusing at 210° centigrade.

Analysis: calculated 49.23 per cent, found 49.02 per cent of chlorine.

The following examples illustrate my invention without, however, limiting the scope thereof:

*Example 1.*

A solution of 100 grammes of aniline in 1.5 litres of chlorobenzene is saturated with dry halogen chloride gas by the action of which a white paste is formed. Chlorine is then introduced into this mixture, whereby the temperature is increased at the end to 100° C. This temperature is maintained while further introducting chlorine for about 2–3 hours. The solution formed is then evaporated in vacuo whereby the residue becomes solid and forms crystals. The body, which is the nonochloroderivative, is further purified by recrystallization from benzine.

*Example 2.*

100 grammes of alpha-naphthylamine are dissolved in 1.5 litres of chlorobenzene and transformed into the hydrochloride by introducing dried hydrochloric acid in form of gas. The mass is cooled and chlorine is introduced into the cold paste, whereupon all the solid matter goes into solution. The temperature is then increased gradually to 100° C. A new paste is formed which is dissolved once more by proceeding chlorination. The solution is evaporated in vacuo and gives a syrup-like solution which is diluted with petroleum ether. By evaporation of this latter solvent the hexachloroderivative is obtained in the form of beautiful crystals.

*Example 3.*

Hydrogen chloride gas is introduced into a solution of 100 grammes of beta-naphthylamine in 800 c. c. of benzene and the whole is stirred until the hydrochloric acid gas escapes in large quantities. While cooling, chlorine is introduced up to saturation and then the mass is gradually heated on the water-bath, whereby solution takes place. The solution thus obtained is concentrated in vacuo, the benzene is removed by repeated addition of benzine in vacuo, whereby the chloro-derivative begins to separate out; then the mass is cooled and filtered. In this manner, about 200 grammes of a product which melts at 115° C. are obtained, while the fusion point of the pure product is 118½° C.

When working with alpha- and beta-aminoanthraquinones and with negatively substituted amines the transformation into the hydrochlorides is not necessary.

The following examples illustrate this simplified process.

*Example 4.*

20 grammes of finely powdered and dried alpha-amino-anthraquinone are suspended in 600 c. c. of benzene. While cooling, chlorine is introduced into the mass, the temperature thereof being gradually increased to the boiling point of benzene. The solution thus produced is evaporated in vacuo and the residue is diluted with carbon tetrachloride.

The product of reaction separates out in the form of crystals.

*Example 5.*

The preparation of the hexachloro-beta-amino-anthraquinone is the same as that indicated in Example 4 for the alpha-amino-anthraquinone, except that the benzene is here replaced by chlorobenzene.

*Example 6.*

Chlorine is directly introduced into a solution of 20 grammes of 2:5-dichloroaniline in 600 c. c. of chlorobenzene, while cooling. There results a thick paste which is then thinned by continued addition of chlorine. The mixture is now heated to about 100° C., the whole solid matter thus passing into solution. At this moment the introduction of chlorine is stopped. The solution is filtered and the chlorobenzene is evaporated in vacuo. A crystalline body separates out from which by repeated re-crystallization from petroleum ether, colorless crystals are obtained fusing at 125° C.

The analysis shows that 8 atoms of chlorine entered the molecule, as seen from the following formula:

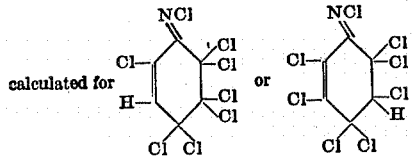

76.5 per cent of chlorine, found 76.2 per cent of chlorine.

These new bodies obtained as described are useful intermediate products for coloring matters, dyes and other convenient purposes.

What I claim is:

1. A process for the manufacture of highly chlorinated hydroaromatic products containing nitrogen, consisting in chlorinating aromatic amino-compounds suspended in an indifferent liquid, which does not permit hydrolysis, with chlorine gas at ordinary temperature and in subsequently heating the reaction mass.

2. A process for the manufacture of highly chlorinated hydroaromatic products containing nitrogen, consisting in treating aromatic amines suspended in an indifferent liquid, which does not permit hydrolysis, with dry hydrogen chloride gas, and in chlorinating the reaction product with chlorine gas at ordinary temperature and in subsequently heating the reaction mass.

3. As new articles of manufacture, the herein described products which are obtained by chlorination of aromatic amino compounds suspended in an indifferent liquid, which does not permit hydrolysis, with chlorine gas at ordinary temperature and subsequent heating of the reaction mass and which are characterized as being highly chlorinated bodies of the hydroaromatic series containing more chlorine atoms than the corresponding aromatic bodies, when in the latter all the positions capable of being substituted are occupied by chlorine, by their contents of nitrogen and by their having easily reacting chlorine atoms, being colourless of feebly coloured, well crystallized bodies, soluble in benzene and analogous organic solvents and which constitute useful intermediate products for dyes.

4. As a new article of manufacture, the herein described product which is obtained by chlorination of alpha-aminoanthraquinone suspended in an indifferent liquid, which does not permit hydrolysis, with chlorine gas at ordinary temperature and subsequent heating of the reaction mass and which is characterized as being a highly chlorinated body of the hydroaromatic series containing more chlorine atoms than the corresponding aromatic body when in the latter all the positions capable of being substituted are occupied by chlorine, by its content of nitrogen and by its having easily reacting chlorine atoms, forming bright-yellow crystals melting with decomposition at 190° centigrade, being soluble in benzene and constituting a useful intermediate product for dyes.

In witness whereof I have hereunto signed my name this 7th day of February, 1923.

THÉODORE VOLTZ.